United States Patent [19]

Marsh et al.

[11] Patent Number: 4,483,508

[45] Date of Patent: Nov. 20, 1984

[54] GRADIENT POWER VALVE ASSEMBLY

[75] Inventors: Keith D. Marsh, St. Clair Shores; Roy O. Erickson, Utica, both of Mich.

[73] Assignee: Colt Industries Operating Corp, New York, N.Y.

[21] Appl. No.: 351,269

[22] Filed: Feb. 22, 1982

[51] Int. Cl.[3] .......... F16K 31/385

[52] U.S. Cl. .......... 251/61.3; 251/61.5; 261/69 A

[58] Field of Search .......... 137/505.38, 505.39, 137/505.42, 505.41; 261/50 A, 69 A, 69 R; 92/98 D, 98 R, 100; 251/61.5, 61.3

[56] References Cited

U.S. PATENT DOCUMENTS

| | | | |
|---|---|---|---|
| 3,235,237 | 2/1966 | Goetz et al. | 261/69 A |
| 3,387,622 | 6/1968 | Weinstein | 137/505.42 |
| 3,572,387 | 3/1971 | De Martelaere | 261/69 A |
| 3,575,088 | 4/1971 | Baner | 92/98 D |
| 3,852,383 | 12/1974 | Seaman | 261/69 R |
| 3,907,941 | 9/1975 | Herbert et al. | 261/69 R |

*Primary Examiner*—Martin P. Schwadron
*Assistant Examiner*—Stephen M. Hepperle
*Attorney, Agent, or Firm*—Walter Potoroka, Sr.

[57] ABSTRACT

A power valve assembly has a pressure responsive diaphragm acting generally in opposition to spring means for controlling the position of a related contoured valving member; when engine manifold decreases due to increasing engine loads, motion transmitting means associated with the pressure responsive diaphragm operatively engages and causes the valving member to be progressively further opened generally in accordance with the decrease in the magnitude of such engine manifold vacuum.

18 Claims, 4 Drawing Figures

GRADIENT POWER VALVE ASSEMBLY

FIELD OF THE INVENTION

This invention relates generally to carburetors and more particularly to valve assemblies therefor which, during certain conditions of engine operation, supply rates of fuel flow to the engine in excess of that which can be supplied as by the main fuel metering system.

BACKGROUND OF THE INVENTION

It has been accepted practice to provide, in carburetor structures, a power fuel enrichment system comprised of a power valve assembly carried by the carburetor in a manner so as to be effected by engine manifold vacuum. The manifold vacuum acting on a movable pressure responsive member, which is adapted for operative engagement with the valving means of the power valve assembly, at idle or normal load conditions, as well as during engine deceleration is strong enough to overcome a spring resistance so as to maintain the valving means closed. When high power demands place a greater load on the engine and manifold vacuum drops below a predetermined value, the said spring overcomes the reduced vacuum thereby opening the valving means. Consequently, fuel flows through the open valve means and ultimately into the carburetor induction passage thereby enriching the otherwise normal fuel-air mixture. As engine demands are reduced manifold vacuum again increases. The increased vacuum acts on the pressure responsive member to finally overcome the resistance of the said spring thereby closing the valving means and shutting off the added supply of fuel which is no longer required.

The prior art has also suggested that such power valve assemblies be constructed so as to provide such additional fuel in distinct stages instead of providing a single increased rate of fuel flow in order to thereby more closely tailor the increase in fuel flow to the requirements of the engine.

However, heretofore, such multistage power valve assemblies have not been entirely successful because of certain undesirable characteristics. For example, the multistage power valve assemblies of the prior art have employed serially positioned valving members each of which coacted with serially situated valve seats. Usually such valve members were not positively guided during their movements toward and away from the valve seats thereby often creating a cocked position of the valve with respect to the seat.

Further, when such serially positioned valves were to be totally actuated, the opening force transmitted to the second valve would have to continually overcome a variable force of an intermediate spring situated between the first valve and a fixed spring seat. This increased the difficulty of attaining precise operating points with respect to which the second valve would open.

Further, because of governmentally imposed limitations on engine exhaust emissions and also governmentally imposed requirements for minimizing fuel consumption, the prior art power valve assemblies are found to be undesirable because the additional rates of fuel flow supplied thereby do not closely follow the actual increased rates of fuel flow required by the engine and instead usually exceed such additional fuel requirements.

Accordingly, the invention herein disclosed and claimed is primarily directed to the solution of the foregoing and other related and attendant problems of the prior art.

SUMMARY OF THE INVENTION

According to the invention a gradient power valve assembly comprises a spring biased valving member resiliently normally held in a closed position, and pressure responsive diaphragm means acted upon by engine vacuum for normally preventing related spring-loaded plunger-like actuator means from initiating opening movement of said spring biased valving member.

Various general and specific objects and advantages of the invention will become apparent when reference is made to the following detailed description considered in conjunction with the accompanying drawings.

BRIEF DESCRIPTION OF THE DRAWINGS

In the drawings wherein for purposes of clarity certain details and/or elements may be omitted.

DETAILED DESCRIPTION OF THE PREFERRED EMBODIMENT

Figure 1:
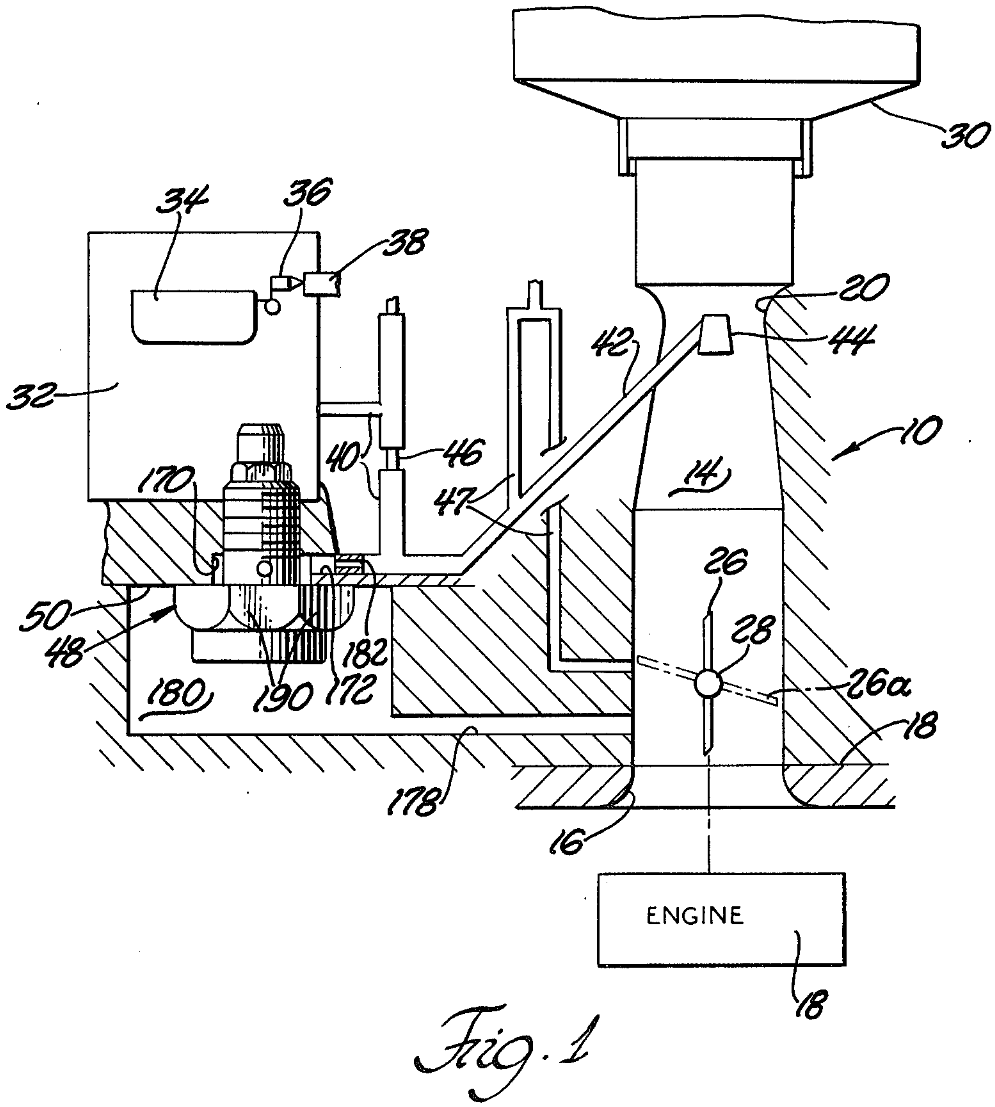
FIG. 1 is a generally diagrammatic view of a carburetor and the fuel system thereof showing, in relatively enlarged scale, a power valve assembly employing teachings of the invention.

Referring now in greater detail to the drawings, FIG. 1 diagrammatically illustrates a carburetor 10 having a body 12 with an induction passage 14 formed therethrough communicating with a passageway 16 of the intake manifold 18, of an associated internal combustion engine 19, upon which the carburetor 10 is suitably mounted. The induction passage 14 may be comprised of an air inlet 20, a main venturi 22 and a mixture outlet 24 in communication with manifold passageway 16. The flow through the induction passage 14 may be controlled by a throttle valve 26 mounted as on a throttle shaft 28 for pivotal rotation therewith so as to be variably positioned as by manual operation thereof. Usually, an air cleaner assembly, such as is fragmentarily depicted at 30, is operatively connected to the air inlet 20.

Fuel is supplied to the induction passage 14 as from a reservoir 32 which, in the example shown, is a float chamber of a fuel bowl having a float 34 therein which actuates a fuel valve 36 controlling a fuel inlet 38 leading from any suitable source of supply.

The fuel flows from reservoir or fuel bowl 32 through a conduit 40 to the main fuel nozzle conduit 42 which discharges as at the throat of the main venturi 22. A second venturi 44 may be provided to form a discharge member for the main nozzle. A main metering restriction 46 is provided in conduit means 40, as is the usual practice, and an idling fuel passage 47 may lead as from conduit means 40 or 42 to discharge adjacent the edge of the throttle valve 26 when in its closed position as depicted in phantom lines at **26*a***. Suitable acceleration pump mechanism, as well as check valves, vents and metering orifices may be provided as is well known in the art.

Figure 2:
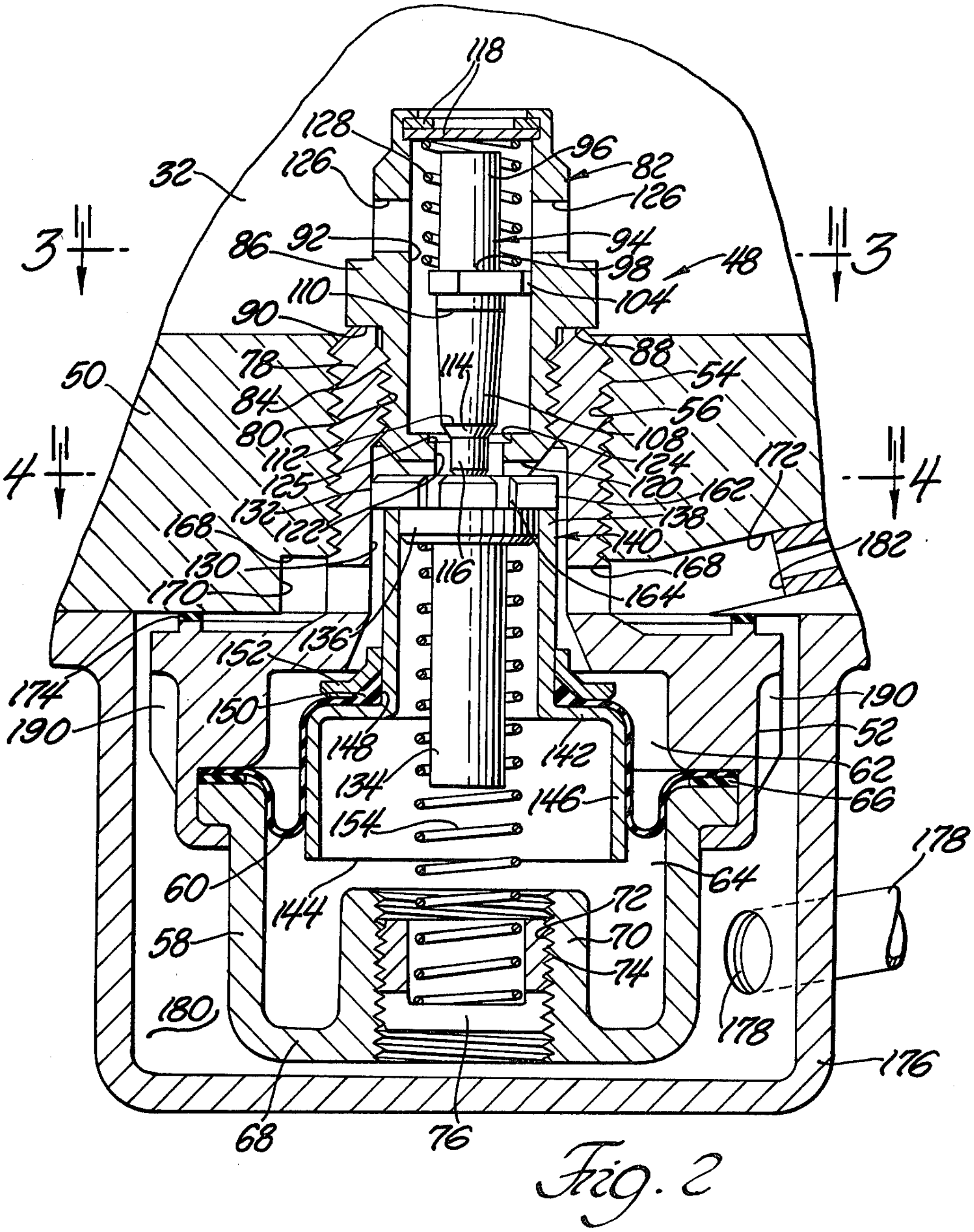
FIG. 2 is an enlarged longitudinal cross-sectional view of the power valve assembly of FIG. 1, employing teachings of the invention.
Figure 3:
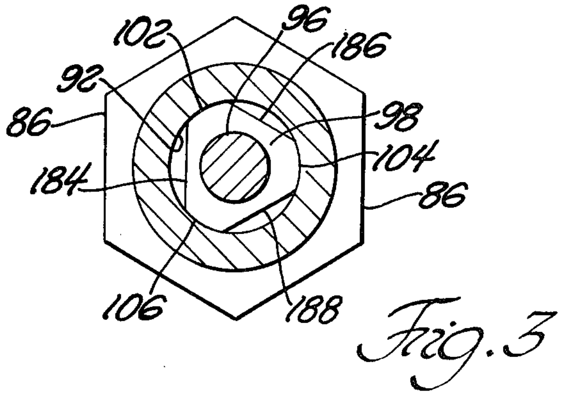
FIG. 3 is a cross-sectional view taken generally on the plane of line 3—3 of FIG. 2 and looking in the direction of the arrows.
Figure 4:
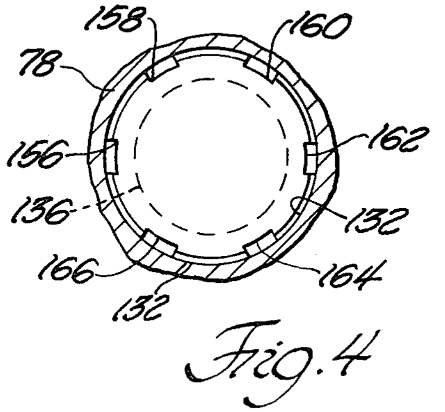
FIG. 4 is a cross-sectional view taken generally on the plane of line 4—4 of FIG. 2 and looking in the direction of the arrows.

As shown in both FIGS. 1 and 2, a gradient power valve assembly 48 is situated within a casing or housing portion 50 of the structure generally defining the reservoir 32. The power valve assembly 48 is illustrated as comprising a generally tubular housing section 52 having formed thereon an externally threaded portion 54 for threadably engaging an internally threaded portion 56 of the casing structure 50.

One end of housing section 52 cooperates with a cover-like end member 58 to peripherally secure a pressure responsive diaphragm 60 therebetween thereby defining two variable and distinct chambers 62 and 64 on opposite sides of the diaphragm. Suitable annular gasket means as at 66 may also be provided. The axial end wall 68 of cover member 58 is preferably provided with an enlarged portion 70 through which is formed an internally threaded passage 72 which threadably receives an externally threaded axially adjustable spring seat member 74 preferably provided as with a transverse slot 76 serving as tool-engaging surface means.

The generally upper (as viewed in FIG. 2) housing portion 78 of housing section 52 is internally threaded as at 80 and threadably receives a valve seat member 82 which is externally threaded as at 84. The valve seat member 82 is preferably formed with suitable tool-engaging surface means 86 (which, when viewed in transverse cross-section, may be of, for example, hexagonal configuration). The valve seat member 82 may be threadably rotated into housing portion 78 until, for example, the underside 88 of tool-engaging surface means 86 abuts against the upwardly directed end surface 90 of housing portion 78.

The valve seat body 82 is provided with an internal cylindrical passage or chamber 92 which, in turn, slidably receives a needle-like valve member 94. As generally illustrated, the needle valve member 94 is preferably comprised of various portions. That is, the uppermost (as viewed in FIG. 2) portion 96 may serve as a spring guide; a valve guide means 98 may be formed as to have an outer diameter 100 slidably received by and against the cylindrical chamber 92 and, further, cutaway in a triangular fashion as to leave only slidable guide portions 102, 104 and 106; a generally cylindrical but selectively contoured axially extending surface 108, extending as between lines 110 and 112; a relatively sharply tapered transitional portion 114; and a cylindrical extension 116 of relatively smallest diameter.

The upper end of chamber 92 is suitably closed as by closure means 118 while the lower end is placed in communication with a plurality of generally radiating grooves or slots 120 as by axially extending passage means 122. Preferably, a stepped counterbore is provided as at 124. A plurality of inlet passage or aperture means 126 are formed through the body of valve seat member 108 as to provide for communication between the interior of fuel reservoir 32 and chamber or passage means 92. As is shown, the upper closure means 118 provide for a fixed spring seat for spring means 128 which passes about valve body portion 96 and, at its opposite end, operatively engages the generally transversely extending guide means 98.

Housing portion 78 of housing section 52 is also provided with a cylindrical inner surface 130 which slidably receives a generally cylindrical head end 132 which may be integrally formed with a lower situated cylindrical spring guide 134. A generally stepped cylindrical surface 136, formed as axially against the head end 132, tightly receives one end 138 of a generally tubular member 140 which, by means of a generally radially extending annular wall portion 142 serves to define a generally inverted cup-like portion 144 having a cylindrical wall portion 146. Preferably end 138 of tubular member 140 is soldered to cylindrical portion 136 as to form an air-tight joint.

The smaller diameter of tubular member 140 passes through a central aperture 148 of diaphragm means 60 and such diaphragm means may be provided as with a generally annular circumscribing bead portion 150 which is sealingly secured to the tubular member 140 as by a suitable annular retainer means 152. As generally depicted, in the preferred embodiment, diaphragm means 60 is of the rolling type so that as tubular member 140 moves upwardly or downwardly the diaphragm 60 tends to roll along the other surface of wall 146. An actuator spring 154, situated generally about the spring guide portion 134 is seated at one end as against the adjustable spring seat 74 and, at its other end, as against the axial face of cylindrical portion 136.

The cylindrical head end 132 may be provided with a plurality of slots, passages or recesses 156, 158, 160, 162, 164 and 166 which provide for fluid flow therethrough and, generally, between the body of head end 132 and the surface of cylindrical passage 130. Body portion 78 is also provided with a plurality of generally radially directed passages or apertures 168 which serve to complete communication as between the annular space between member 140 and cylindrical passage 130, and, for example, an annulus 170, formed as in body portion 50, which, in turn, communicates with a passage or conduit means 172.

If desired, suitable gasket or sealing means, as at 174, may be provided.

Further, in the preferred embodiment, a cup-like outer housing 176 is suitably sealingly secured to the structure 50 and placed in communication with a source of engine intake manifold vacuum as by conduit means 178. In the preferred embodiment, the vacuum conduit means 178 is formed as an integral portion of the structure defining the carburetor assembly, as generally depicted in FIG. 1; however, for ease of illustration, such conduit means 178 is illustrated, in FIG. 2, as an externally situated conduit. As should now be apparent, the interior chamber 180 of the cup-like outer housing 176 is maintained at the same pressure as that of the engine intake manifold. Further, because the spring seat 74 is provided with a through-slot 76, chamber 64 within housing section 58 is also at the same intake manifold pressure.

OPERATION OF THE INVENTION

Generally, it is well known in the art that the value of manifold vacuum generated by the engine will vary depending on such factors as engine speed, road load and throttle valve position. For example, with the engine operating at idle, a relatively high value of manifold vacuum will be generated because, at such time, the throttle valve 26 is in its nominally closed position illustrated in phantom line at 26*a*. During such time, as is well known in the art, the principal means for supplying fuel to the induction passage 14 and intake manifold 16 is by suitable conduitry, such as at 47, and metering means collectively referred to as the idle fuel system. Such idle fuel systems are well known in the art and, for purposes of clarity, are only diagrammatically illustrated herein since the practice of the invention is not in any way limited to or by an associated idle fuel system. During such idle operation the manifold vacuum may be of a value in the order of 16.0 to 19.0 inches of mercury (Hg).

As the vehicle is started into motion by the movement of the throttle valve 26 (in the clockwise direction in FIG. 1) in the opening direction, the load placed on the engine increases and because of the throttle valve 26 being moved toward a more fully opened position the value of the manifold vacuum decreases. The amount of decrease will depend on the load placed on the engine as well as the rapidity with which the throttle valve 26 is rotated from its nominally closed position toward a more fully opened position. If the engine load is sufficiently great and the opening movement of the throttle valve 26 is sufficiently rapid, the manifold vacuum may, during this time, decrease to a value in the order of, for example, 1.0 to 4.0 inches of Hg.

Further, when the vehicle is decelerating with the throttle valve 26 nominally closed and the vehicle driving the engine, the value of the generated manifold vacuum may well substantially exceed that established at idle engine operation and be in the order of, for example, 21.0 to 22.0 inches of Hg.

Accordingly, it can be seen that manifold or engine generated vacuum is related to engine operation and as such may be employed as not only an actuating force but also as a control parameter for related devices. Further, it can be seen that enveloping chamber 180 (FIGS. 1 and 2), chamber 64 and one side of diaphragm 60 will be exposed to manifold vacuum of a varying value, depending upon throttle valve 26 position and engine load by virtue of the communication established by conduit means 178.

The main fuel system, for example, comprising restriction 46, conduit 40 and main nozzle conduit 42, serves to supply fuel to the induction passage 14 generally during normal off-idle engine operation, as is well known in the art. Further, the manifold vacuum acting on diaphragm 60 at conditions of idle, normal load conditions or deceleration is sufficient to overcome the force of spring 154 thereby holding actuating means 140 in a downward-most position and permitting spring 128 to move valving member 94 downwardly until the contoured body portion 108 thereof seats as against the annular relatively sharp-cornered seat 125 thereby terminating any flow through passage 122.

However, when demands for higher power place a greater load on the engine and manifold vacuum decreases below a predetermined value, spring 154 starts to overcome the pressure differential across diaphragm 60 and starts to move the actuator assembly (comprised of tubular member 140 and head end 132) upwardly. With continuing increasing engine loads, the magnitude of the engine or manifold vacuum also decrease causing further upward movement of the valve actuator means. The degree to which such plunger or actuator means moves upwardly, of course, depends on the balance of forces exhibited by the then somewhat extended spring 154 and the pressure differential across diaphragm means 60.

Eventually, with further increasing engine loads and decreasing magnitude of engine vacuum, the plunger or actuator means moves upwardly sufficiently to cause head end 132 to engage needle valve end 116 (which extends beyond the lower end of valve seat body 82) and start to move needle-like valve member 94 axially upwardly. In the preferred embodiment of the invention, from the time that the plunger or actuator means first engages the end 116 of valve 94 and starts to move such valve member 94 upwardly, the gradient metering action thereof is initiated. That is, with further increasing engine loads and decreasing magnitudes of engine vacuum, the actuator means, through head end 132, moves power valve 94 further upwardly so that, because of the contour of valve body portion 108, the rate of fuel flow past power valve member 94 increases generally in accordance with the degree to which such power valve member 94 has been displaced by the actuator means and, therefore, gradiently in accordance with the increase in engine load once a preselected magnitude of engine vacuum has been attained.

When maximum auxiliary fuel flow is required, as at for example wide open throttle engine operation, the magnitude of engine vacuum has diminished sufficiently as to permit spring 154 to move the plunger or actuator means upwardly whereby the upper surface of head end 132 experiences abuting engagement with the lower end surface of valve seat body 94 thereby fully upwardly depressing power valve member 94, against the resilient resistance of spring 128, and enabling the maximum rate of fuel flow past power valve 94 and through orifice or passage means 122 as generally depicted in FIG. 2. Such a maximum rate of fuel flow may further be limited as by calibrated restriction means 182 especially in situations where a standard size of power valve assembly 48 is used in conjunction with engines of different horsepower ratings or other characteristics so as to thereby assure the exact maximum auxiliary fuel flow desired for such engine.

As should now be apparent and as best illustrated in FIG. 2, when power valve member 94 is either partially or, depicted, fully opened, auxiliary fuel flows from fuel reservoir or chamber 32, through passages or apertures 126, into passage means 92 and through the spaces cooperatively defined by the flatted portions 184, 186 and 188 of guide means 98 and passage means 92, through the annular space generally between passage 122 (more particularly the generally sharp-cornered annular portion 125) and the body of valve member 94, then through the generally radially directed slots or grooves 120, through the spaces or passages provided by cut-out or relieved portions 156, 158, 160, 162, 164 and 166, then in the annular space generally between tubular means 140 and passage or cylindrical surface 130 and, eventually through outlet passages or ports 168 into conduit means 172, through calibrated restriction means 182 if such is employed, and ultimately through conduit means 42 to the main discharge nozzle means 44 into induction passage means 14.

In the preferred embodiment, the threaded passageway 56 is of an inner diametral size sufficient to permit the passage therethrough of the valve seat body means 82 so that such valve seat body means 82 may be first operatively secured to housing portion 78 of housing section 52 and then such subassembly threadably secured to the internally threaded portion 56. It should also be pointed out that preferably housing section 52 is provided with suitable generally external tool-engaging surface means 190 by which appropriate tools may be employed for tightly seating the housing section 52 as against portion 50 of the structure generally defining the fuel reservoir 32.

It should be made clear that the invention may be practiced in, generally, two different ways. That is, the first, as already explained is one wherein all fuel flow is terminated through passage 122 when the power valve member 94 is in its downward-most position. The other possibility, however, is where there is a predetermined minimum flow area and therefore a corresponding minimum fuel flow ocurring even when power valve 94 is in its downward-most position. This could be accomplished by having, for example, end 116 of valve member 94 continually abutting against head end 132 which would move only so far as to prevent full closure of valve member 94 or, for example, by having a controlled predetermined leakage-like path generally between power valve member 94 and its cooperating seat means when the valve member 94 is in its nominally closed position.

Although only a preferred embodiment and selected modifications of the invention have been disclosed and described, it is apparent that other embodiments and modifications of the invention are possible within the scope of the appended claims.

What is claimed is:

1. A gradient power valve assembly, comprising power valve housing means, first passage means formed in said housing means for communicating between a source of fuel generally upstream thereof and second fuel passage means generally downstream thereof, a valving member generally axially slidably received in said housing means for varying the rate of fuel flow through said first passage means, first spring means effective for continually urging said valving member toward a first nominally closed position, second spring means effective to overcome the force of said first spring means to move said valving member against the force of said first spring means toward a second position whereat a predetermined maximum effective flow area is defined as between said valving member and said first passage means, and pressure responsive diaphragm means operatively connected to said second spring means and effective when a sufficient pressure differential is experienced across said diaphragm means to prevent said second spring means from moving said valving member from said first position toward said second position, wherein said power valve housing means comprises a valve seat body, said first passage means comprising a portion of said valve seat body, wherein said valve seat body comprises internal chamber means, said internal chamber means containing said valving member for axial movement therein toward and away from said first passage means, wherein said first spring means is situated in said internal chamber means and operatively connected to said valving member as to continually resiliently urge said valving member toward said first position, said valve seat body further comprising port means for completing communication between said source of fuel and said internal chamber means, wherein said power valve housing means comprises a housing body, said diaphragm means being situated internally of said housing body and being peripherally sealingly secured thereto, said diaphragm means comprising a flexible pressure responsive movable diaphragm, a generally tubular actuator means situated generally within said housing body and extending through said diaphragm generally centrally thereof, means retaining said actuator means to said diaphragm, wherein said valve seat body is threadably secured to said housing body, wherein said housing body is in turn threaded for engagement with associated support structure, wherein said actuator means is guidingly slidably received within said housing body for movement toward and away from said valve seat body and said valving member, wherein said second spring means is contained within said housing body and at least partially received within said tubular actuator means, wherein said second fuel passage means is formed in said housing body, and selectively adjustable spring seat means operatively engaging said second spring means, wherein said actuator means comprises a generally tubular member having first and second tubular open ends, wherein said first open end is of a substantially smaller diameter than said second open end, wherein said actuator further comprises a generally cylindrical wall portion closing said first end, wherein said cylindrical wall portion is in sliding contact within said housing body as to thereby serve as guiding means for causing said actuator means to be guiding slidably received within said housing body and wherein said second spring means is in operative engagement with said generally cylindrical wall portion.

2. A gradient power valve assembly according to claim 1 wherein said valve seat body carries a valve seat, wherein said valving member comprises a selectively contoured axially elongated body portion effective for cooperating with said valve seat, said contoured body portion being so contoured as to be generally progressively larger in axially transverse cross-section as the point of measurement progresses from the end closest to said valve seat.

3. A gradient power valve according to claim 1 wherein said adjustable spring seat means comprises pressure passage means formed therethrough as to be thereby capable of communicating vacuum generated by an associated engine to one side of said diaphragm means.

4. A gradient power valve assembly according to claim 1 wherein said valve seat body carries a valve seat, wherein said valving member comprises a selectively contoured axially elongated body portion effective for cooperating with said valve seat, said contoured body portion being so contoured as to be generally progressively larger in axially transverse cross-section as the point of such measurement progresses from the end closest to said valve seat, and wherein said adjustable spring seat means comprises pressure passage means formed therethrough as to be thereby capable of communicating vacuum generated by an associated engine to one side of said diaphragm means.

5. A gradient power valve assembly according to claim 1 wherein said valving member comprises guide means operatively slidingly engaging the surface of said internal chamber means, and wherein said guide means comprises at least one relieved portion as to provide for a path of flow from said port means past said guide means and through said first passage means.

6. A gradient power valve assembly according to claim 1 wherein said generally cylindrical wall portion comprises first and second cylindrical wall portions, wherein said first and second cylindrical wall portions are integrally formed with each other, said first cylindrical wall portion being closely situated within said first end, wherein said second cylindrical wall portion is of a diameter larger than said first cylindrical wall portion, and wherein said first end axially abuts against said second cylindrical wall portion.

7. A gradient power valve assembly according to claim 1 wherein said valving member comprises guide means operatively slidingly engaging the surface of said internal chamber means, wherein said guide means comprises at least one relieved portion as to provide for a path of flow from said port means past said guide means and through said first passage means, wherein said actuator means comprises a generally tubular member having first and second tubular open ends, wherein said first open end is of a substantially smaller diameter than said second open end, wherein said actuator means further comprises a generally cylindrical wall portion closing said first end, and wherein said second spring means is in operative engagement with said generally cylindrical wall portion.

8. A gradient power valve assembly according to claim 7 wherein said generally cylindrical wall portion comprises first and second cylindrical wall portions, wherein said first and second cylindrical wall portions are integrally formed with each other, said first cylindrical wall portion being closely situated within said first end, wherein said second cylindrical wall portion is of a diameter larger than said first cylindrical wall portion, wherein said first end axially abuts against said second cylindrical wall portion.

9. A gradient power valve assembly, comprising power valve housing means, first passage means formed in said housing means for communicating between a source of fuel generally upstream thereof and second fuel passage means generally downstream thereof, a valving member generally axially slidably received in said housing means for varying the rate of fuel flow through said first passage means, first spring means effective for continually urging said valving member toward a first nominally closed position, second spring means effective to overcome the force of said first spring means to move said valving member against the force of said first spring means toward a second position whereat a predetermined maximum effective flow area is defined as between said valving member and said first passage means, and pressure responsive diaphragm means operatively connected to said second spring means and effective when a sufficient pressure differential is experienced across said diaphragm means to prevent said second spring means from moving said valving member from said first position toward said second position, wherein said power valve housing means comprises a valve seat body, said first passage means comprising a portion of said valve seat body, wherein said valve seat body comprises internal chamber means, said internal chamber means containing said valving member for axial movement therein toward and away from said first passage means, wherein said first spring means is situated in said internal chamber means and operatively connected to said valving member as to continually resiliently urge said valving member toward said first position, said valve seat body further comprising port means for completing communication between said source of fuel and said internal chamber means, wherein said power valve housing means comprises a housing body, said diaphragm means being situated internally of said housing body and being peripherally sealingly secured thereto, said diaphragm means comprising a flexible pressure responsive movable diaphragm, a generally tubular actuator means situated generally within said housing body and extending through said diaphragm generally centrally thereof, means retaining said actuator means to said diaphragm, wherein said valve seat body is threadably secured to said housing body, wherein said housing body is in turn threaded for engagement with associated support structure, wherein said actuator means is slidably received within said housing body for movement toward and away from said valve seat body and said valving member, wherein said second spring means is contained within said housing body and at least partially received within said tubular actuator means, wherein said second fuel passage means is formed in said housing body, and selectively adjustable spring seat means operatively engaging said second spring means, wherein said actuator means comprises a generally tubular member having first and second tubular open ends, wherein said first open end is of a substantially smaller diameter than said second open end, wherein said actuator means further comprises a generally cylindrical wall portion closing said first end, wherein said second spring means is in operative engagement with said generally cylindrical wall portion, wherein said generally cylindrical wall portion comprises first and second cylindrical wall portions, said first cylindrical wall portion being closely situated within said first end, wherein said second cylindrical wall portion is of a diameter larger than said first cylindrical wall portion, and wherein said first end axially abuts against said second cylindrical wall portion, and further comprising relieved means formed on said second cylindrical wall portion as to provide for a path of fluid flow past said second cylindrical wall portion.

10. A unitary gradient power valve assembly, comprising power valve housing means, first passage means formed in said housing means for communicating between a source of fuel generally upstream thereof and second fuel passage means generally downstream thereof, a valving member generally axially slidably received in said housing means for varying the rate of fuel flow through said first passage means, first spring means effective for continually urging said valving member toward a first nominally closed position, second spring means effective to overcome the force of said first spring means and to move said valving member against the force of said first spring means toward a second position whereat a predetermined maximum effective flow area is defined as between said valving member and said first passage means, and pressure responsive diaphragm means carried by said housing means and operatively connected to said second spring means and effective when a sufficient pressure differential is experienced across said diaphragm means to prevent said second spring means from moving said valving member from said first position toward said second position, wherein said power valve housing means comprises a valve seat means, said first passage means comprising a portion of said valve seat means, wherein said valve seat means comprises internal chamber means, said internal chamber means containing said valving member for axial movement therein toward and away from said first passage means, wherein said first spring means is situated in said internal chamber means and operatively connected to said valving member as to continually resiliently urge said valving member toward said first position, wherein said valving member is the only valving member in said power valve assembly, said valve seat means further comprising port means for completing communication between said source of fuel and said internal chamber means, said diaphragm means comprising a flexible pressure responsive movable diaphragm, a generally tubular actuator means situated generally within said housing means and extending through said diaphragm generally centrally thereof, means retaining said actuator means to said diaphragm, wherein said actuator means is guidingly slidably received within said housing means for movement toward and away from said valve seat means and said valving member, wherein said second spring means is at least partially received within said tubular actuator means, selectively adjustable spring seat means operatively engaging said second spring means, and fastening means carried by said housing means as to thereby enable the said power valve assembly to be as a unitary structure operatively secured to associated support structure, wherein said actuator means comprises a generally tubular member having first and second tubular open ends, wherein said first open end is of a substantially smaller diameter than said second open end, wherein said actuator further comprises a generally cylindrical wall portion closing said first end, wherein said cylindrical wall portion is in sliding contact within said housing body as to thereby serve as guiding means for causing said actuator means to be guidingly slidably received within said housing body and wherein said second means is in operative engagement with said generally cylindrical wall portion.

11. A unitary gradient power valve assembly according to claim 10 wherein said valve seat means comprises a valve seat, wherein said valving member comprises a selectively contoured axially extending body portion effective for cooperating with said valve seat, said contoured body portion being so contoured as to be generally progressively larger in transverse cross-section as the point of measurement progresses from the end closest to said valve seat.

12. A unitary gradient power valve according to claim 10 wherein said adjustable spring seat means comprises pressure passage means formed therethrough as to be thereby capable of communicating vacuum generated by an associated engine to one side of said diaphragm means.

13. A unitary gradient power valve assembly according to claim 10 wherein said valve seat means comprises a valve seat, wherein said valving member comprises a selectively tapered axially extending body portion effective for cooperating with said valve seat, said body portion being so contoured as to be generally progressively larger in axially transverse cross-section as the point of such measurement progresses from the end closest to said valve seat, and wherein said adjustable spring seat means comprises pressure passage means formed therethrough as to be thereby capable of communicating vacuum generated by an associated engine to one side of said diaphragm means.

14. A unitary gradient power valve assembly according to claim 10 wherein said valving member comprises guide means operatively slidingly engaging the surface of said internal chamber means, and wherein said guide means comprises at least one relieved portion as to provide for a path of flow from said port means past said guide means and through said first passage means.

15. A unitary gradient power valve assembly according to claim 10 wherein said generally cylindrical wall portion comprises first and second cylindrical wall portions, wherein said first and second cylindrical wall portions are integrally formed with each other, said first cylindrical wall portion being closely situated within said first end, wherein said second cylindrical wall portion is of a diameter larger than said first cylindrical wall portion, and wherein said first end axially abuts against said second cylindrical wall portion.

16. A unitary gradient power valve assembly according to claim 10 wherein said valving member comprises guide means operatively slidingly engaging the surface of said internal chamber means, wherein said guide means comprises at least one relieved portion as to provide for a path of flow from said port means past said guide means and through said first passage means, wherein said actuator means comprises a generally tubular member having first and second tubular open ends, wherein said first open end is of a substantially smaller diameter than said second open end, wherein said actuator means further comprises a generally cylindrical wall portion closing said first end, and wherein said second spring means is in operative engagement with said generally cylindrical wall portion.

17. A unitary gradient power valve assembly according to claim 16 wherein said generally cylindrical wall portion comprises first and second cylindrical wall portions, wherein said first and second cylindrical wall portions are integrally formed with each other, said first cylindrical wall portion being closely situated within said first end, wherein said second cylindrical wall portion is of a diameter larger than said first cylindrical wall portion, and wherein said first end axially abuts against said second cylindrical wall portion.

18. A unitary gradient power valve assembly, comprising power valve housing means, first passage means formed in said housing means for communicating between a source of fuel generally upstream thereof and second fuel passage means generally downstream thereof, a valving member generally axially slidably received in said housing means for varying the rate of fuel flow through said first passage means, first spring means effective for continually urging said valving member toward a first nominally closed position, second spring means effective to overcome the force of said first spring means and to move said valving member against the force of said first spring means toward a second position whereat a predetermined maximum effective flow area is defined as between said valving member and said first passage means, and pressure responsive diaphragm means carried by said housing means and operatively connected to said second spring means and effective when a sufficient pressure differential is experienced across said diaphragm means to prevent said second spring means from moving said valving member from said first position toward said second position, wherein said power valve housing means comprises a valve seat means, said first passage means comprising a portion of said valve seat means, wherein said valve seat means comprises internal chamber means, said internal chamber means containing said valving member for axial movement therein toward and away from said first passage means, wherein said first spring means is situated in said internal chamber means and operatively connected to said valving member as to continually resiliently urge said valving member toward said first position, said valve seat means further comprising port means for completing communication between said source of fuel and said internal chamber means, said diaphragm means comprising a flexible pressure responsive movable diaphragm, a generally tubular actuator means situated generally within said housing means and extending through said diaphragm generally centrally thereof, means retaining said actuator means to said diaphragm, wherein said actuator means is slidably received within said housing means for movement toward and away from said valve seat means and said valving member, wherein said second spring means is at least partially received within said tubular actuator means, selectively adjustable spring seat means operatively engaging said second spring means, and fastening means carried by said housing means as to thereby enable the said power valve assembly to be as a unitary structure operatively secured to associated support structure, wherein said actuator means comprises a generally tubular member having first and second tubular open ends, wherein said first open end is of a substantially smaller diameter than said second open end, wherein said actuator means further comprises a generally cylindrical wall portion closing said first end, wherein said second spring means is in operative engagement with said generally cylindrical wall portion, wherein said generally cylindrical wall portion comprises first and second cylindrical wall portions, said first cylindrical wall portion being closely situated within said first end, wherein said second cylindrical wall portion is of a diameter larger than said first cylindrical wall portion, and wherein said first end axially abuts against said second cylindrical wall portion, and further comprising relieved means formed on said second cylindrical wall portion as to provide for a path of fluid flow past said second cylindrical wall portion.

* * * * *